(No Model.)

H. A. KUWITZKY.
STEAM FEED COOKER.

No. 535,911. Patented Mar. 19, 1895.

Witnesses:
L. C. Hills
A. L. Hough

Inventor:
Horace A. Kuwitzky,
By Franklin H. Hough
Atty.

UNITED STATES PATENT OFFICE.

HORACE A. KUWITZKY, OF NEBRASKA CITY, NEBRASKA.

STEAM FEED-COOKER.

SPECIFICATION forming part of Letters Patent No. 535,911, dated March 19, 1895.

Application filed December 31, 1894. Serial No. 533,491. (No model.)

*To all whom it may concern:*

Be it known that I, HORACE A. KUWITZKY, a citizen of the United States, residing at Nebraska City, in the county of Otoe and State of Nebraska, have invented certain new and useful Improvements in Steam Feed-Cookers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in cookers, and especially to an automatically operated steam feeding cooker in which water may be fed to the receptacle carrying the feed, the supply of water being regulated by a valve operated by a float designed to be carried in a tank of water, suitable connection being had between the float and the valve whereby the said valve is opened as the water in the tank settles, and closes as the water rises.

A still further object of the invention resides in the adjustability of the float whereby steam may be utilized, by lowering the float so as to allow but a small quantity of water to enter the cooking receptacle.

To these ends and to such others as the invention may relate, the same consists in the novel construction, combination and adaptation of the parts as will be hereinafter more fully described and then specifically defined in the appended claim.

I clearly illustrate my invention in the accompanying drawings, which with the letters of reference marked thereon form a part of this specification, and in which drawings—

Figure 1:
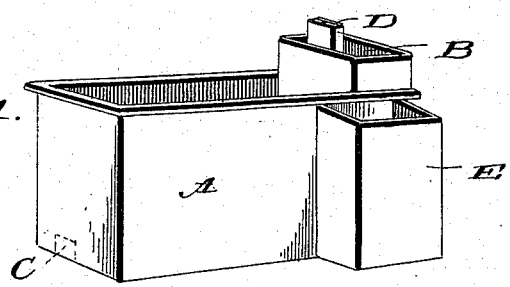
Figure 2:
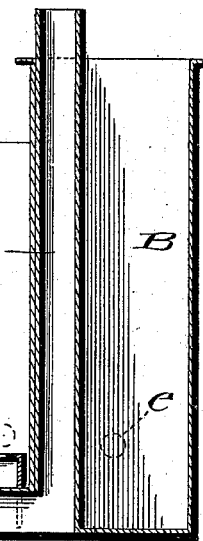
Figure 3:
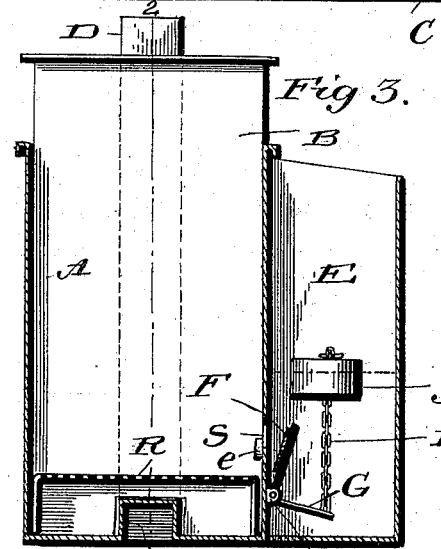
Figure 4:
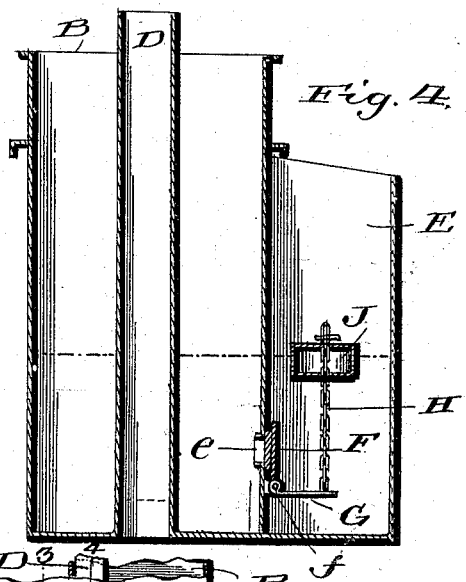
Figure 5:
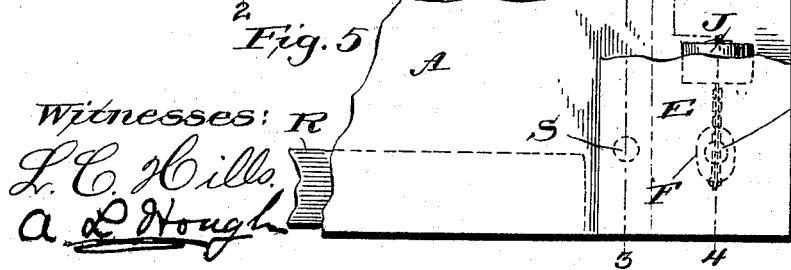

Figure 1, is a perspective view of the cooker complete. Fig. 2 is a central sectional view. Fig. 3 is a sectional view of the valve and float on the line 3, 3 of Fig. 5; Fig. 4, a sectional view on the line 4, 4 of Fig. 5, and Fig. 5 is a side elevation.

Reference now being had to the details of the drawings by letter, A designates the cooker proper, which is made of sheet iron, at the rear end of which is a water tank B, and C is a flue extending longitudinally through the bottom of the cooker, it being formed by recessing a portion of the bottom of the cooker, and has connection with an inclosed flue D which passes up through the said water tank, and is connected with a smoke stack not shown.

Secured to the side of the tank B is a smaller tank E which has communication with the tank B through the perforation e, which is covered by a valve F which is pivoted to a lug f by means of the rod G, which rod has secured, at its outer end, a chain or rod H passing up through a float J, and the location at which it is desired to carry the float, is regulated by means of a pin k passing through one of the links of the chain.

R is a perforated tray designed to be placed within the cooker, and to be suspended at a suitable distance from the bottom.

The device is to be mounted upon a suitable arch or fire place, which has communication through the flues to the smoke stack, the water being slightly heated by reason of the flue passing through the tank. It will be noted that the water is allowed to pass from the tank E to the inside of the cooking receptacle carrying the tray, through the perforation S, and the operation of the invention is as follows:—The tray carrying the feed is suspended within the cooker, and as the water evaporates and passes off in steam, the supply from the tank is automatically fed into the cooking receptacle through the aperture S from the smaller tank E, the supply to which is regulated by the valve opening or shutting as the water lowers and rises, suitable connection being had between the said valve and float.

Having thus described my invention, what I claim to be new, and desire to secure by Letters Patent, is—

In combination the receptacle A, water tank B, a flue recessed in the bottom of the said receptacle A, and having communication with a flue passing through the said water tank, a perforated tray suspended within the said receptacle, and a tank carrying a float secured to and having communication with the said tank B, a valve F connected to said float, and a communication between the tank E and receptacle A, substantially as shown and described.

In testimony whereof I affix my signature in presence of two witnesses.

HORACE A. KUWITZKY.

Witnesses:
JNO. W. STEINHARD,
FRED W. ROTTMANN.